Figure 1:
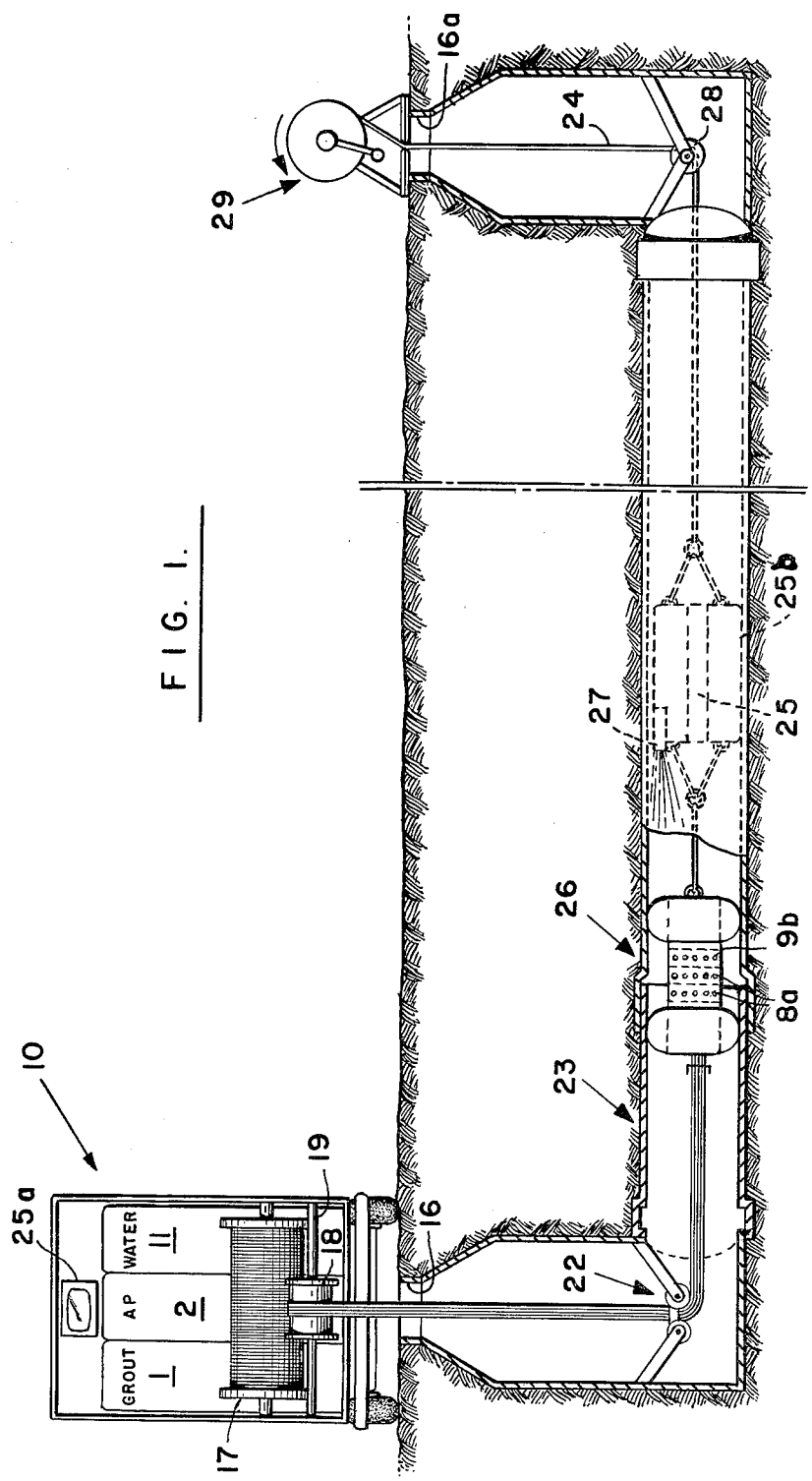

United States Patent [19]
Clarke

[11] 4,318,835
[45] Mar. 9, 1982

[54] MAGNESIUM DIACRYLATE, POLYOL MONOACRYLATE GROUTING COMPOSITION AND METHOD FOR GROUTING JOINTS AND/OR CRACKS IN SEWER CONDUITS THEREWITH

[75] Inventor: William J. Clarke, Ridgewood, N.J.

[73] Assignee: Hayward Baker Company, Odenton, Md.

[21] Appl. No.: 170,474

[22] Filed: Jul. 21, 1980

[51] Int. Cl.$^3$ .............................................. C08L 33/02
[52] U.S. Cl. ..................................... 264/36; 526/240;
523/122; 523/130; 523/131; 524/375; 524/849;
524/208; 252/8.5 A; 252/8.55 R
[58] Field of Search ................. 526/240; 260/29.6 PS,
260/29.7 H, 29.7 T, 45.75 K; 106/15.05, 16;
264/36

[56] References Cited

U.S. PATENT DOCUMENTS

| | | | |
|---|---|---|---|
| 2,651,619 | 9/1953 | De Mello | 526/240 |
| 2,801,984 | 8/1957 | Morgan | 260/41 |
| 2,801,985 | 8/1957 | Roth | 260/41 |
| 3,136,360 | 6/1964 | Ramos | 166/12 |
| 3,344,019 | 9/1967 | Sowa | 260/45.75 K |
| 3,580,879 | 5/1971 | Higashimura | 260/29.7 H |
| 3,915,917 | 10/1975 | Weiant | 260/29.6 PS |
| 4,026,712 | 5/1977 | Drury | 106/16 |
| 4,094,150 | 6/1978 | Clarke | 260/29.7 H |

OTHER PUBLICATIONS

"All About Cyanamid AM-9 Chemical Grout", American Cyanamide Company, 1975.

*Primary Examiner*—Paul R. Michl

[57] ABSTRACT

This invention is concerned with an aqueous liquid composition comprising unsaturated monomers including (1) magnesium diacrylate and/or calcium diacrylate, (2) a polyol monoacrylate selected from hydroxyethyl acrylate and hydroxypropyl acrylate, and (3) a polyethylenically unsaturated monomer copolymerizable with (1) and (2) to produce covalent cross-linking bonds in the copolymer besides the ionizable magnesium bonds. The weight ratio of (3) to the sum of (1) and (2) is in the range of about 3:97 to about 5:95. Examples of monomers that can be used as part or all of component (3) include N,N'-methylene-bis-acrylamide and ethylene glycol diacrylate. The relative proportions between the several monomers are selected to provide on polymerization a cross-linked vinyl addition polymer gel containing both covalent (non-ionic) cross-linking bonds and ionic cross-linking bonds and the relative proportions between the several components are predetermined to render the composition suitable for application by conventional mixing packer equipment hereinafter described. In such equipment, means is provided to direct a second aqueous solution or suspension containing a water-soluble free radical initiator, such as a persulfate or peroxide, separately but concurrently with the first monomer-containing solution to a common distributor head of the movable packer positioned in the sewer conduit adjacent the joint or crack to be repaired. The monomer solution is provided with a tertiary amine which serves as a reducing agent, thereby providing a redox polymerization system so that when the two liquids mix, upon discharge from the head, a rapid polymerization to a polymer gel occurs at the ambient temperature.

14 Claims, 2 Drawing Figures

MAGNESIUM DIACRYLATE, POLYOL MONOACRYLATE GROUTING COMPOSITION AND METHOD FOR GROUTING JOINTS AND/OR CRACKS IN SEWER CONDUITS THEREWITH

BACKGROUND OF THE INVENTION

Morgan et al U.S. Pat. No. 2,801,984, Aug. 6, 1957 discloses compositions for stabilization and impermeabilization of soils with a water-soluble copolymerizable mixture of an alkylidene bisacrylamide, particularly N,N'-methylene bisacrylamide, with a relatively large proportion of one or more water-soluble ethylenic monomers. The latter monomer is broadly defined in the passages of column 2, lines 59–71, and from column 8, line 50, to column 9, line 13. The extensive list of specific monomers presented in column 9, lines 14 to 71 includes alkaline earth metal as well as alkali metal acrylates and methacrylates. However, in lines 16–18 of this passage, N-methylol-acrylamide, calcium acrylate, and methacrylamide are especially mentioned as examples and it is asserted that optimum results are obtained with acrylamide. In the actual working examples, acrylamide, N-methylol acrylamide, and calcium acrylate, or mixtures of two or more of them are used.

Roth U.S. Pat. No. 2,801,985 Aug. 6, 1957 is similar to Morgan et al in respect to the definition of the covalent crosslinker and that of the water-soluble ethylenic comonomer but is based on the use of nitrilotrispropionamide (NTP) as the activator (or accelerator) of a redox system. All working examples use a mixture of acrylamide and N,N'-methylene bisacrylamide, in most of which the polymerizable mixture comprises 95% of acrylamide and 5% of the bisacrylamide which is designated in the patent as "Stabilizer AM-955" and like AM-9 and "AM-9 PLUS", is a registered trademark of American Cyanamid Co. for mixtures of acrylamide and N,N'-methylene bisacrylamide.

Rakowitz U.S. Pat. No. 2,940,729 discloses the use of a water soluble ferrocyanide or ferricyanide to inhibit gelation of soil stabilizers in applications where temperatures are relatively high as in oil well drilling or deep mine shafts. The working examples of this patent show the effect of the inhibitors on AM-955.

Ramos et al U.S. Pat. No. 3,136,360, June 9, 1964 discloses the addition of a "filter aid material", such as diatomaceous earth, to gel-forming sealing compositions such as the AM-9 compositions of Roth supra for use for sealing-off an underground water-bearing formation penetrated by the bore of a well in which air or gas drilling operations are being performed. Clarke, U.S. Pat. No. 4,094,150, June 13, 1978, incorporates an unfired natural diatomaceous earth, 80% having a particle size between about 2 and 10 microns, in an acrylamide/N,N'-methylene bisacrylamide grout of the AM-9 category.

Higashimura et al, U.S. Pat. No. 3,580,879 May 25, 1971 discloses grouting compositions and quick-setting cements suitable for injection into interstices or fissures in earth formations including soil and rock masses in order to impermeabilize them against the transmission of fluids therethrough. The gelable compositions may comprise (1) 1 to 90 weight % of a metal (meth)acrylate (2) 3 to 90 weight % of a water-soluble ethenoid monomer, such as acrylamide or a hydroxyalkyl or an aminoalkyl (meth)acrylate, and (3) 1 to 30 weight % of a water-soluble divinyl monomer. The metal of (1) may be monovalent or polyvalent (column 3, line 72 to column 4, line 7); the monomer of (2) may be acrylamide or any of those mentioned in column 3, lines 40–53; and the divinyl monomers may be any of those listed in the passage of column 3, lines 61–8. However, the gist of the patent is the use of certain unusual and exotic redox catalyst systems for accelerating the polymerization and shortening the gel time.

American Cyanamid Company bulletin ENT-15 having 8 pages and published in 1977 illustrates on page 5 thereof typical "mixing packer" grouting equipment of conventional construction for grouting leaky joints or cracks in a sewer line or conduit. The AM-9, AM-955, and AM-9 PLUS grouts have had extensive commercial application for the grouting of sewer lines or other conduits using this type of equipment. This grout which contains a large proportion of acrylamide (a neurotoxic chemical) is a serious health hazard and, as stated on pages 6, 7, and 8 of this bulletin (ENT-15), requires special care, clothing, and so on. Other American Cyanamid Company bulletins on grouting sewer lines with AM-9 or AM-9 PLUS that show this type of equipment include EN-115 (1975), especially pages 1-5 thereof; EN-111A (1975), page 2; and the 95 page booklet EN-4 (1975), page 26 especially. Attempts heretofore to provide effective chemical grouts adapted to be applied in sewer lines by conventional equipment without acrylamide content by using calcium or magnesium acrylate or methacrylate have previously been unsuccessful for one or more of various reasons: too much shrinkage by loss of water on setting of the polymer gel; too strong a polymer gel making it difficult or impractical to move the "packer unit" to the next grouting position within the line; too long a gel time—about 10 to 30 seconds gel time is required for efficient sealing of sewer joints; too high viscosity—in practice, a low viscosity (about 2 to 10 cps or lower) grout is required to seal the joint and to penetrate the soil around the joint.

DESCRIPTION OF THE INVENTION

In accordance with the present invention there has been discovered an efficient chemical grout which contains no acrylamide and is adapted to be applied by conventional grouting equipment having a mixing-packer unit that can be pulled or moved through the sewer line or other waste conduit from one manhole to the next, with only brief interruption of the movement at longitudinally spaced positions within the conduit wherever a joint or fissure which needs sealing to stop seepage or leakage is located.

The present invention is concerned with an improved chemical grouting composition having two fluid (liquid or dispersion) systems containing no acrylamide, which are fed in separate flexible hoses to the site of application, e.g. within a sewer conduit where they are mixed and react very rapidly (about 10 to about 30 seconds) to form a polymer gel which serves to seal or grout a leaky joint or crack in a sewer or other waste overflow or drain lines or conduits which may extend through the soil or subsoil above or below the water table. Such sewer lines or conduits may be formed of a series of tubular pipe sections formed of cast iron, polypropylene and more commonly of ceramic or clay tile. The sections may have an internal diameter of about eight inches to twenty-four inches and lengths of 2 to 10 feet or more between joints. At spaced intervals along the sewer line network, manholes are provided for access by a person to inspect or service the conduit or conduits extending between the manholes.

Figure 2:
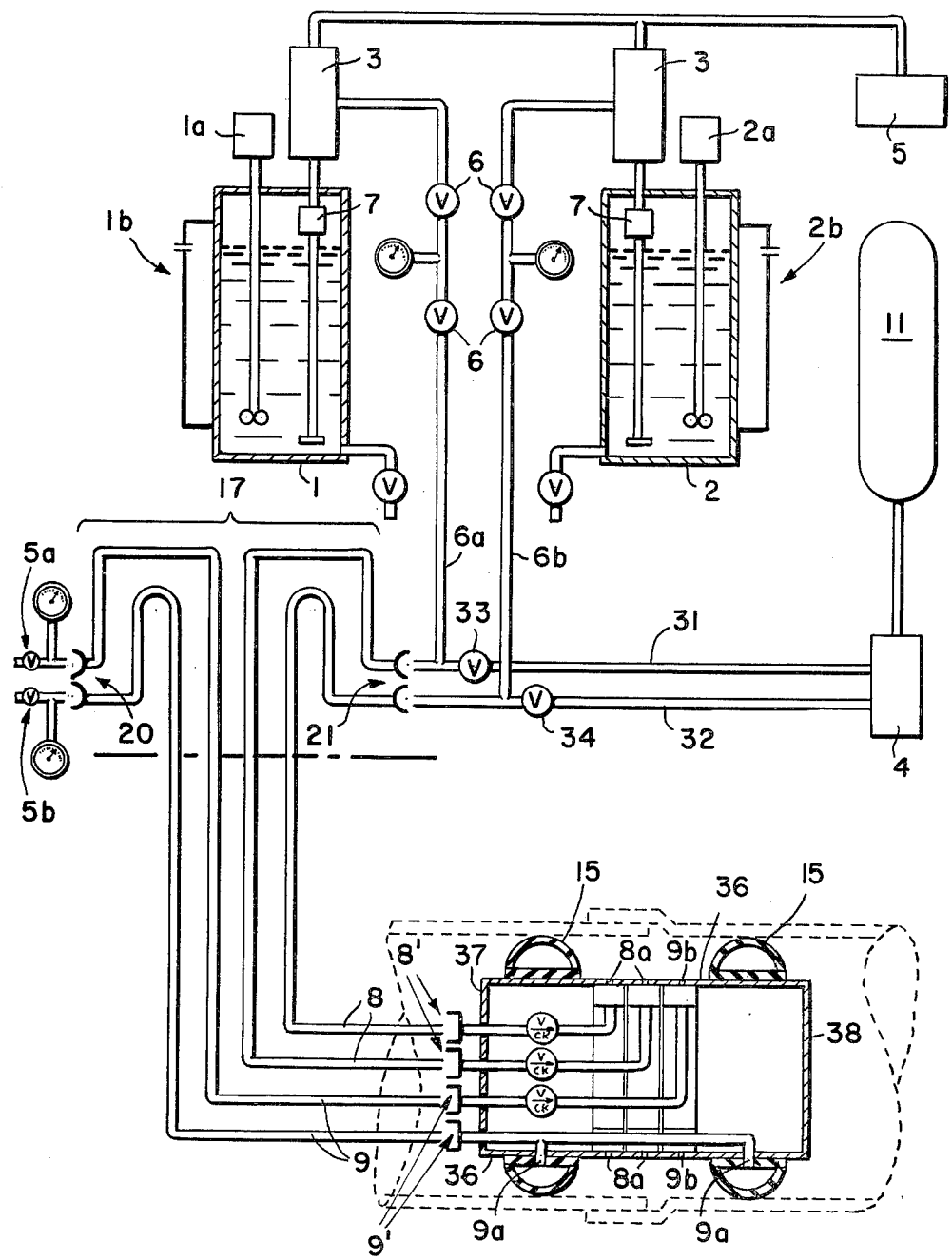

In the drawing, which illustrates one type of conventional equipment that may be used to grout sewer lines with the grouting composition of the present invention, FIG. 1 is an elevation view, partly in section, showing the arrangement of the equipment in place for grouting the leaks within a sewer line and FIG. 2 is a diagrammatic view of the conventional mixing packer and associated equipment that has heretofore been used for applying AM-9 grout.

FIG. 2 herein corresponds essentially to FIG. 6 on page 5 of the American Cyanamid Company bulletin ENT-15 mentioned hereinabove under the heading "Background of the Invention".

FIG. 1 shows the portable servicing equipment in position for grouting a sewer line. A truck 10 carrying three tanks 1, 2, and 11 for supplying the monomer components (referred to simply as the grout), the initiator AP, and water respectively is shown backed up to operating position above a sewer manhole 16. Tanks 1 and 2 contain Component A (or part A) and Component B (or part B) of the two-liquid component system. A group of four flexible hoses wound as a multiple-hose unit on a supply reel 17 are guided over the traverse guide 18 that is mounted for limited reciprocal motion on the stationary rod 19 supported at the back end of the truck. The four hoses comprise two air hoses 9, (See FIG. 2) one for inflating and deflating the packer bladders 15 (made of rubber or synthetic rubber or elastomer) through the valves 9a and the other (for testing the grout) having one or more discharge openings 9b in the distributor head of the mixing packer unit. The reel 17 has rotary connectors 20 and 21 of conventional type to allow rotation of the reel on its axis while maintaining connection with a supply of compressed air (e.g. 6 psi) from conduits 5a and 5b (at 20) and with the desired grout tank, AP tank 2, or water tank 11 (at 21). The 4-hose unit or group passes under a guide or pulley 22 which is temporarily mounted near the bottom of the manhole to guide the 4-hose group into the sewer conduit 23 where it is drawn by a cable or rope 24, and by the interconnected "string" of devices, closed circuit TV camera 25, and mixing packer 26. The camera is directed to view the inside of the sewer line adjacent the distributor head of the packer when the bladders 15 are in deflated condition. A light source 27 carried on the camera serves to light up the field of view for the camera. The camera and light source are carried within the sewer line by a suitable slidable frame 25 to which the cable 24 is attached at the leading end (to the right of the frame). A segment of cable 24 ties the other end of the camera frame to the leading end of the mixing packer. A guide pulley 28 is stationarily mounted temporarily at the bottom of the next manhole 16a so that the cable 24 can be pulled through the sewer line and wound on a windlass 29. In FIG. 2, the water tank 11 is shown with pressure pumps 4 and pump discharge lines 31 and 32 controlled by valves 33 and 34. Normally these valves remain closed so that the two-part Grout-/AP liquids in tanks 1 and 2 are supplied by the pump (3) discharge lines and through the rotary connectors 21 to the grout hoses 8. The purpose of the water tank 11 is to clear any of hoses 8 or ports 8a of the distributor head in the event of clogging.

In FIG. 2, the specifications for certain of the equipment that may be used for the numbered items include:

(1) Grout tank for chemical grout, 50 gal., stainless steel
(2) Tank for ammonium persulfate (AP), 50 gal., stainless steel
(3) Positive displacement pumps, piston type, 5-20 gpm, 40-180 psi, stainless steel
(4) Positive displacement pumps, piston type, 2½-7 gpm, 200-900 psi, stainless steel
(5) Compressor, 180 psi, 30 CFM
(6) Quick opening valves
(7) Inline filters, 1/16" openings
(8) Grout hose, ½" 3000 psi maximum pressure, 100 psi operating pressure; 8' quick disconnect valves
(9) Air hose ½", 3000 psi maximum pressure, 100 psi operating pressure; 9' quick disconnect valves 1a and 2a, motors for agitators in tanks (1) and (2) 1b and 2b, level sight gages for tanks (1) and (2) 5a and 5b, compressed air supplies, e.g. at 6 psi or higher It is to be understood that no claim is herein made that this equipment per se is novel or patentable. It is described herein merely to facilitate understanding of the problems entailed in the application of a grout by this type of equipment for grouting sewer lines. It is acknowledged that acrylamide methylenebisacrylamide grouts have been applied in this type of equipment but such usage is extremely hazardous because of the severe neurotoxicity of acrylamide.

The mixing tanks, pumps, flexible lines or hoses (suitable reeling equipment for latter), compressed air supplies and associated fittings (valves, rotary connectors, etc.) may be mounted on a truck to bring the equipment near one manhole providing access to the sewer line or conduit. The hoses are connected to an assembly called a mixing packer which can be drawn into and in steps through the sewer conduit to be grouted at leaky joints or cracks. This packer may have various structural details. However, as shown in FIG. 2, it may simply be a hollow drum 36 closed at each end 37 and 38 and having a cylindrical periphery of lesser diameter than the inside diameter of the sewer conduit 23 (diagrammatically shown in phantom outline). An annular hollow inflatable bladder 15 or "donut" is provided on the outside of the hollow drum 36 adjacent each end thereof.

In FIG. 2, the bladders are shown inflated to form a tight seal against the inside walls of the sewer conduit, thereby providing a confined annular space adjacent the joint or crack to be grouted. The two flexible grout hoses 8 from the respective grout and initiator tanks 1 and 2 are connected by quick-release couplings to suitable pipes which extend through end wall 37 into the drum 36 and then to annular headers within the periphery of the hollow drum or tube 36 having two rings of openings or ports 8a between the packer bladders. Each of pipes 8 have check valves and terminate in a respective one of the inside annular headers having one or more openings 8a in the drum periphery so that this intermediate portion of the drum may be referred to as a distributor head, each grout solution being isolated from the other until they flow out of the openings 8a and mix in the outer annular space between the two bladders. A compressed air hose 9 (30 psi) is connected to the lowermost pipe extending into the drum and having ports 9a entering the bladders to inflate them and another compressed air hose 9 (5-6 psi) is provided with a quick-release coupling to connect it to a third pipe having a checkvalve. This pipe extends to a third inner annular header to direct compressed air to one or more discharge openings 9b in the intermediate section of the drum cylinder so that sealing by the gel can be tested before deflating the bladders and shifting the packer assembly to the next joint or leaky crack in the sewer conduit. To aid the shifting of the packer assembly 26 to the next joint or crack to be grouted, a rope, chain or cable 24 may be attached to a suitable hook or eye-bolt secured to the leading end 3 of the packer assembly (the right end as viewed in FIG. 2). This cable may extend through the sewer line to the next manhold 16a where it can be used to pull the packer to the next point in the line needing grouting. Closed circuit television may be employed to assist in the locating of the packer with its mixing header intermediate portion in alignment with a joint or crack to be grouted. This may be done by tying a TV camera 25 in the cable line 24 a short distance from the leading end of the packer and illuminating that end of the packer by means of a light source 27 which like the camera is directed toward that end of the packer. Because the bladders 15 are in collapsed (deflated) condition during the pulling of the packer within the sewer conduit, the operator monitoring the TV receiver 25a which may be located in the truck 10 can see when the packer header is positioned properly for grouting each site or zone (crack or joint) needing grout. At that point, he stops the pulling of the cable, inflates the bladders, actuates the grout pumps, tests the seal at an appropriate time interval after grouting, deflates the packer bladders, and repeats the cycle until all leaky joints or cracks in the conduit have been grouted. Thus, in general, conventional equipment for grouting of joints or cracks in a sewer conduit by applying the grout inside the conduit comprises an assembly of a liquid-distributing header which may take the form of a drum having a cylindrical periphery of a diameter smaller than the inside diameter of the conduit. At each side of the header drum or mounted on axially spaced portions of the drum periphery there is an inflatable annular "donut", bladder or ring of rubber or synthetic rubber. These rings, when deflated, are smaller in outer diameter than the inside diameter of the conduit, but are connected by a flexible hose to a compressed-air line to expand their outer diameters to form a tight seal or barrier in the conduit and thereby confine the grouting material to the annular zone between the header periphery and the adjacent wall of the conduit when the assembly is in position for grouting a joint or a crack in the conduit. The assembly of the distributor and the expansible rubber rings is commonly called a "mixing packer" by the operators. Flexible hoses, each connected to a supply tank for a respective one of the liquid systems or components of the grout, terminate in separate radially-extending pipe systems which have one or more discharge openings in the header periphery between the bladders.

Any suitable detector system may be used to determine when the header of the packer is aligned with a joint or crack in the wall of the conduit. This may comprise a light source and closed-circuit television camera in the conduit connected to a TV receiver which may be mounted where an operator controlling the grouting procedure can monitor it. Thus, the receiver may be provided in a truck carrying two stainless steel tanks 1 and 2 for supplying the separate grout liquid systems components, A and B respectively, a reel for paying out or reeling in the flexible hoses which may be a four-component hose, two for the grout systems A and B, and two for compressed air, one of which is used to inflate the rubber rings of the packer and the other is connected to the header to air-test the seal. The contents of the two tanks 1 and 2 may be under pressure or a positive displacement pump may be provided with each tank to discharge the contents of the respective tanks at the proper rate to mix the separate streams in the proper predetermined proportion when they are discharged from their respective openings in the drum header during grouting.

This type of equipment has been used for grouting leaky joints or cracks in sewer conduits with a two-liquid component chemical grouting system in which one liquid was an aqueous solution of acrylamide and N,N'-methylenebisacrylamide containing dimethylaminopropionitrile, and the other liquid was an aqueous ammonium persulfate solution. The overall composition of the mixture obtained in the annular zone between the disc periphery and the conduit wall may be an aqueous solution of about 9.5 weight % of acrylamide, about 0.5 weight % of N,N'-methylenebisarylamide, 0.8 weight % of dimethylaminopropionitrile and 2 weight % of ammonium persulfate. The resulting mixture forms a gel in 30 seconds at 60° F.

Briefly, the sequence of operation of the equipment is as follows: The packer and TV camera are placed in the sewer line and connected to a cable in series. They are drawn into the conduit with the camera in advance of the packer until the distributor of the packer reaches a leaking joint or crack as determined by monitoring with the closed-circuit TV. The packer assembly is stopped, the rubber rings are inflated to expand them tightly against the conduit wall, and the two liquid components A and B of the chemical grout in tanks 1 and 2 are forced to the distributor of the packer where they issue and mix, penetrate the fissures of the joint or crack and then the soil or earth adjacent to or surrounding the conduit joint or crack. The grout polymerizes to form a gel which fills the confined annular zone inside the conduit, extends through the leaky passages or fissures in the joint or the wall of the conduit, and also penetrates into the soil or earth adjacent or surrounding the outside surface of the conduit where it serves to stabilize the soil or earth. The grouted joint or crack is tested with compressed air at 4 to 6 psi or higher before deflating the packer rings. Then, the packer rings are deflated and the packer assembly is moved to the next leaky joint. The movement of the packer may be impeded or even prevented by the gel ring formed inside the conduit if the polymer gel has a high gel strength and/or a high shear (or tear) strength. Also, the gel formed must have a moderate adhesion to the conduit wall but not such a strong adhesion thereto that movement of the packer assembly cannot break the inside gel ring away from the conduit with a low to moderate force. Another quality required is that of frangibility (which also involves tear strength). The movement of the packer assembly relative to the inside gel ring should not only release it from adherence to the conduit wall, but should effect a crumbling of the gel ring without disintegration of its outer portion which seals the joint, crack or fissure in the conduit, so that the flow of sewage or waste will wash the crumbs or particles along the inside of the sewer line without impeding the desired waste flow. The packer movement and grouting sequence is repeated until all leaks in the sewer lines and the network thereof are sealed.

The chemical grout containing a large proportion of acrylamide, in spite of its neurotoxicity, has been used for sealing leaky joints in sewer lines by means of the equipment described above for many years because it produces a gel that has the special properties required to work satisfactorily in such equipment. Because of its toxicity, acrylamide grout use is a hazard for the workers handling it.

In accordance with the present invention, a chemical grout is provided that is characterized by relatively low toxicity, and especially in respect to little or no neurotoxicity, of the monomeric components while having the low viscosity, rapid gelling, and other characteristics required for practical application by conventional equipment of the general type described hereinabove, which for convenience hereinafter is simply referred to as sewer line packer equipment, by the general procedure wherein the mixing packer is passed within the line with brief interruptions of such passage at the points in the line needing grouting.

The grouting composition that has been discovered to provide the necessary properties comprises monomers falling in three distinct categories, namely (1) magnesium diacrylate in major amount, which for the sake of simplicity may herein be referred to as magnesium acrylate (MgA), (2) a hydroxyalkyl monoacrylate selected from 2-hydroxyethyl acrylate (HEA), 2-hydroxypropyl acrylate (2-HPA), 3-hydroxypropyl acrylate (3-HPA), or mixtures thereof, especially the commercially available mixtures of the hydroxypropyl acrylates (HPA) obtained from propylene glycol and acrylic acid which generally contain a predominant proportion of the 2-hydroxypropyl isomer (87 to 93%) and a minor proportion of the 3-hydroxypropyl isomer (7 to 13%), and (3) a relatively small amount of about 3% up to about 5% by weight, based on total monomer weight of at least one copolymerizable crosslinking polyethylenically unsaturated monomer in which at least two unsaturated radicals are joined exclusively by covalent bonds, in contrast with MgA wherein the two unsaturated acrylate radicals are joined by the ionizable Mg bonds. The proportion of the covalent crosslinker that is actually used may be limited by the water-solubility of the particular crosslinker or mixture thereof that is selected and the particular comonomer mixture and its concentration in this aqueous solution. Thus, when N,N'-methylenebisacrylamide (MBA), a preferred crosslinker, is used as the entire covalent crosslinker, the preferred range of proportion is from about 4 to 5% by weight. While MBA is mentioned as the preferred covalent crosslinker, other alkylidene bis-acrylamides which do not retard the gel-setting time may be used, such as those of Lundberg, U.S. Pat. No. 2,474,846, the disclosure of which is incorporated herein by reference. Other covalent crosslinkers may also be used such as glycol diacrylate, glycerol diacrylate, 1,3-di(acrylamidomethyl)-2-imidazolidone, allyl acrylate, and 1,3,5-triacrylylperhydro-1,3,5-triazine, provided they do not retard the gel-time to an undesirable extent.

The relative proportions between the several monomers in the first or grout part (part A), containing a total of about 20 weight % monomer content that provide the quick gel time and satisfactory gel properties with conventional amounts of a redox system wherein a water-soluble peroxide or persulfate, especially ammonium persulfate (AP), free radical initiator and a tertiary amine, especially triethanolamine (TEA), the amine being present in the first part, namely the monomer solution (part A), and the AP being in the second part (part B) (tanks 1 and 2 (parts A and B) respectively in FIGS. 1 and 2) are: (1) about 8 to 10 parts by weight of MgA, (2) about 1.6 to 2.4 parts by weight of a hydroxypropyl acrylate (HPA) or hydroxethyl acrylate (HEA) or mixtures thereof, and (3) about 0.25 to about 0.40 part by weight of covalent crosslinker, e.g. MBA. The monomer ratio in a preferred embodiment or best mode is 8 weight parts of MgA, 2 weight parts of HPA, and 0.3 weight part of MBA.

The aqueous grout solution of monomers just described is fed by one of the grout hoses 8 to the distributor header of the packer unit and the other aqueous solution or dispersion of free radical initiator is fed to the header by another of the flexible hoses so that upon discharge of the two solutions from the header, they mix with resultant rapid polymerization to form the grouting gel polymer. In its simplest version, the initiator dispersion is an aqueous solution of a water-soluble free radical initiator, such as ammonium persulfate (AP), potassium persulfate (KP) or t-butyl peroxide, the concentration of the initiator being from about 0.3 to 6 weight %, based on the total weight of parts A and B making up the grouting mixture. As stated above, the packer equipment may have a feed system in which the relative proportions of the two aqueous solutions, the monomer solution which may be referred to as component A or part A and the initiator solution which may hereinafter be simply referred to as component B or part B, may be predetermined to provide the mixing of the desired amounts thereof on discharge from the distributor header of the packer. In practically all cases, the amounts of the two components A and B which are simultaneously discharged from the header for mixing together at the leaky joint or crack can be of approximately equal volumes and the components A and B are made up in the examples set forth hereinafter on the basis that (unless otherwise specifically stated) the grouting will be effected by mixing A and B in approximately equal volume proportions. It is to be understood, however, that the proportion of monomer in component A and the tertiary amine contents of part A may be changed relative to the free radical initiator content of part B to adapt the system to operate satisfactorily with equipment which feeds the two components A and B in a volume ratio other than 1:1 as stated.

In the grouting system of the present invention, component A which contains all of the monomer, MgA, hydroxylalkyl acrylate, and covalent crosslinker, also contains about 0.3 to 4% by weight, based on total weight of parts A and B making up the grouting mixture, of a water-soluble tertiary amine, such as triethanolamine (TEA) which upon mixing with the component B containing a peroxy initiator, forms a redox system. The reducing agent, TEA, speeds up the polymerization, and hence is frequently referred to as an activator, an accelerator, or even more commonly as a catalyst.

Surprisingly, these monomer compositions comprising MgA, hydroxalkyl acrylate, and MBA meet all the requirements for economical application with a mixing-packer in sewer lines needing grouting. This particular combination of monomers has been found to provide grouting gels comparable with the acrylamide gels, heretofore commonly used for grouting sewer lines with mixing-packer type of equipment. These monomer compositions have been found to copolymerize with a short gel time on the order of 10 to 30 seconds with a conventional redox system using triethanolamine. Thereby, unusual or exotic components of redox systems which are often correspondingly more expensive and difficult to reliably control are avoided.

The monomers used in the grout composition of the present invention are much less toxic than the acylamide grout heretofore used. Furthermore, the overall monomer cost of the grout is considerably less. Also, like acylamide grout, the monomer concentration in part A is about 20%, and part B when mixed with part A at the site of grouting in the sewer dilutes it to about 10 weight % which produces the polymer gel having the rapid gel time, the adhesive strength in conjunction with moderate cohesive and shear strength and friability required to allow the movement of the packer to the next site or zone in the conduit needing grouting, while maintaining the integrity of the portion of the gel which serves to seal the fissures of a joint or crack in the sewer line.

To inhibit growth of fungi, algae, slime and bacteria in the monomer solution itself and on the gel formed in the sewer, a biocide effective to control such growth may be incorporated in the grout monomer solution (part A) in an amount of about 50 to 500 parts per million, the biocide used being one that does not retard the gel time to such an extent that it falls appreciably outside the range hereinabove specified. Thus, Component A or part A, and optionally part B as well, may contain a small but effective amount on the order of 50 to 500 parts per million (ppm) of a biocide, of slight but limited solubility in water, having fungicidal, slimicidal, algicidal, and/or bactericidal action to inhibit deterioration of the components and the polymer gels formed therefrom by microbial attack, especially by such microorganisms that domestic and industrial wastes abundantly contain.

Various biocidal compositions may be used, such as various quaternary ammonium compounds; for instance, tetraalkylammonium chloride, sulfate, or hydroxide in which one or two of the alkyl groups have from 6 to 18 or more carbon atoms, specific examples of which include: cetyldimethylbenzlammonium chloride monohydrate, myristyldimethylbenzylammonium chloride dihydrate, myristyltrimethylammonium bromide, stearyldimethylbenzylammonium chloride, cetyldimethylethylammonium bromide, and cetyltrimethylammonium p-toluenesulfonate. Various organometal salts or oxides, such as bis(trialkyltin) oxide may also be used. Generally, these compounds in which the alkyl group has 4 to 8 carbon atoms, such as n-butyl, are commercially available. An example thereof is bis(tributyltin)oxide, which may be dispersed with a suitable emulsifying or dispersing agent. The quaternary ammonium biocides just mentioned may also serve as the dispersing agent. The bis(tributyltin)oxide may be mixed with one or more of these quaternary ammonium biocides to aid in dispersing the insoluble oxide so that there is a dual biocidal action obtained. The 3-isothiazolones of U.S. Pat. Nos. 3,761,488 and 4,127,687 may be used, such as 5-chloro-2-methyl-3-isothiazolone or 4, 5-dichloro-2-benzyl-3-isothiazolone or 2-n-octyl-3-isothiazolone. The isothiazolone may be dissolved in a small amount of isopropanol and then diluted with water to favor dispersion in part A or part B of the present composition. The entire disclosure of these two patents are incorporated herein by reference.

Because of the practically water-insoluble nature of the most effective of these biocides, they may require anionic, cationic, or nonionic surfactant dispersing agents to disperse them in the aqueous components A and/or B. Such dispersion or suspension serves to distribute the biocide with the associated surfactant throughout the polymer gel formed and assures that release from the gel grout is at best extremely slow, thereby maintaining biocidal protection of the grout over an extended period of time. The surfactant itself may have biocidal activity so that both the dispersed biocide and the dispersing surfactant function to exert supplemental and/or complemental protective action as is exemplified by the use of one of the long chain alkyl dimethyl benzyl ammonium chlorides with the bis(tributyltin) oxide above. The amount of the quaternary biocidal dispersant may be greatly in excess of the amount needed merely to disperse the organotin oxide. When a quaternary biocide is used, it may be combined with the polymer gel formed by replacing part of the magnesium ions with the cationic radical of the quaternary ammonium compounds. This salt formation may also contribute to the slow release of the biocide from the gel.

In addition, the aqueous solution A may contain an agent to inhibit the entry and growth of roots in the grouted joints and cracks of a sewer line. The commonly used compound for this purpose is 2,6-dichlorobenzonitrile (DCBN) which is commercially available as a product in which it is mixed with or absorbed on, finely divided clay particles as a carrier in a weight ratio of about 1:1. In this form, the clay aids in dispersing it, and it is quite compatible with the other ingredients of the grouting component A as made up in accordance with the present invention. The amount of DCBN may be such as to provide a concentration thereof of about 200 to 400 ppm in the mixture of components A and B. A small amount of a surfactant may be used to emulsify or disperse the DCBN in an aqueous component, such as component A; a nonionic surfactant such as p-t-octylphenoxypoly(10 to 50)ethoxyethanol, may be used for this purpose.

Optionally, there may be included in one component, but preferably in both components A and B (in relative proportions to keep the viscosities in both about the same) of the two-part composition of the present invention up to about 10% by weight, based on the total weight of A and B when they are supplied to the packer in approximately equal volumes, of finely-divided water-inert solid particles having surfaces, irregular and/or porous, which may be simply referred to as "filter aid material" and are useful when the sewer conduit to be grouted happens to be located in coarse earth or crushed stone or rock. The rate of flow of such a grout through the numerous channels in the surrounding earth is slowed down by the particle-loaded grout so that the channels are blocked or "blinded" with the particulate materials, thereby preventing rapid escape of the grout away from the zone immediately surrounding the zone of the sewer conduit being grouted. Examples of such materials include diatomaceous earth and various synthetic calcium silicate compounds as described in Ramos et al U.S. Pat. No. 3,136,360 and Clarke U.S. Pat. No. 4,094,150, and the disclosures of those patents in reference to the "filter aid material" are incorporated herein by reference.

The amounts of filter aid material, such as diatomaceous earth, should not be so high as to raise the viscosity of the two component dispersions sufficiently to interfere with the ease of forcing or pumping them to the distributor head of the packer. Suitable surfactant dispersing agents may be used to disperse the filter aid material when it is included. As stated above, the use of filter aid material is optional but in some instances depending on the nature of the fissures in the line and the soil or earth in or about the line, the use of the filter aid material may be quite desirable. Whereas particulate matter, such as sand, lime, clay, and cement tends to increase the strength of the grout formed from the aqueous dispersions A and B, the amount of such matter, even when added in the form of filter aid material, such as diatomaceous earth, should not be so high as to provide a polymer gel within the sewer line surrounding the packer having such strength (adhesive, cohesive and shear) as to interfere with the shifting of the packer with its collapsed bladders to the next stage of grouting.

In the preferred grout of the present invention, the monomer composition (component A) is an aqueous solution containing dissolved therein about 20% by weight of a mixture of magnesium diacrylate, hydroxypropyl acrylate and N,N'-methylene-bisacrylamide in which the relative weight proportions of the monomers are about 16 MgA, about 4.0 hydroxypropyl acrylate, and about 0.6 MBA, the remainder of component A being primarily water except for a small content (1–3 parts by weight) of TEA, an effective content of a biocide and surfactant (100 to 400 ppm each), and a small but effective amount (20–100 ppm) of a stabilizer to reduce hydrolysis of HEA or HPA and to inhibit premature polymerization, to thereby prolong shelf-life of component A. An example of a stabilizer is methyl ether of hydroquinone (MEHQ). When the grout is to be used where root inhibition is desirable, an effective content of 2,6-dichlorobenzonitrile (e.g. 50% on an inert carrier) with a surfactant to disperse it (50 to 400 ppm of each). The preferred composition of aqueous component B is a solution of 1 to 4 weight % of ammonium persulfate (AP) in water. It may also contain dispersed therein part of the biocide and surfactant used in component A. In certain applications, an optional content of diatomaceous earth and dispersing agent as mentioned above may be present in both components. As stated, these A and B compositions are given for the normal situation in which these compositions are fed to the packer unit in approximately equal volume amounts.

The grout of the present invention used at about 10% monomer concentration, has a desirable combination of properties. It does not exhibit syneresis (liberation of excess water) on initial gel formation. It forms a gel which maintains its volume in an environment of 100% relative humidity. In dry climates such as in Arizona and Texas, ethylene glycol may be added to either or both parts A and B in an amount of about 10 to 25 weight % to provide shrinkage control. Ethylene glycol (in amounts of 10 to 50%) can be added selectively to part A or B to balance the viscosities of the parts. Ethylene glycol may also be used to prevent freezing.

This grout produces a polymer gel which adapts it well to application within sewer lines or conduits by the use of conventional mixing-packer equipment. It produces in a short time of 10 to 30 seconds, a gel of medium strength and having a low enough adhesion to the inside of the sewer line and to the members of the packer to allow facile movement of the packer unit to the next grouting position after each grouting operation and such movement also breaks up or macerates the polymer gel inside the conduit at the grouted joint without pulling out an appreciable portion thereof from within the crack or fissure that is sealed thereby.

The grouting components A and B have low viscosity on the order of about 2 to 10 centipoises which allows practical pumping pressures to force them through conventional sewer grouting equipment. They are also adapted to readily pass through the leaky joints or cracks of a sewer line to be grouted and to the soil around the line, using the conventional mixing-packer equipment.

The grout of the present invention contains no free acrylamide which is a neurotoxic chemical. The grout of the present invention is of low toxicity and is considered to have one one-hundreth the toxic exposure of AM-9 as follows:

1/10 amount of toxic monomer in grout of the invention,

½ monomer toxicity (MBA has an $LD_{50}$ of 390 mg/kg; acrylamide shows an $LD_{50}$ of 200 mg/kg (albino rats), 1/2.5 MBA is not neurotoxic . . . "did not display neurotoxicity at dose schedules and conditions employed." (MRI Project No. 4308-N for OTS study dated May, 1979, page 287), ½ grout of the invention is a liquid; and any dust toxicity is eliminated.

The A and B component mixture of the present invention has a pH in the range of about 6 to 9 and gelation occurs controllably and rapidly (in about 10 to 30 seconds) after mixing. Since the two components are aqueous solutions or dispersions that can be supplied in that form to the grouting workers in the field, toxicity and fire hazards resulting from handling dusts and flammable or explosive organic solvents are virtually nonexistent in field operations for applying the grout of the present invention.

In the following illustrative examples, the parts and percentages are by weight and the temperatures are in degrees Centigrade unless otherwise indicated.

EXAMPLE 1

Four Part A monomer solutions in water are prepared having the compositions set out in Table 1. This includes the best mode in (d).

TABLE I

| Ingredients | Grout Solutions (Part A) Parts | | | |
|---|---|---|---|---|
| | (a) | (b) | (c) | (d) |
| MgA 35% aq. solution | 22.8 | 22.8 | 22.8 | 22.8 |
| 2-Hydroxyethyl acrylate (HEA) | 2.0 | | | |
| 2-Hydroxypropyl acrylate (2-HPA) | | 2.0 | | |
| 3-Hydroxypropyl acrylate (3-HPA) | | | 2.0 | |
| Propyleneglycol monoacrylate (HPA) | | | | 2.0 |
| N,N'-Methylene bisacrylamide (MBA) | 0.3 | 0.3 | 0.3 | 0.3 |
| Triethanolamine 95% aq. solution | 1.0 | 1.0 | 1.0 | 1.0 |
| Biocide* | 0.04 | 0.04 | 0.04 | 0.04 |
| Stabilizer** | 0.002 | 0.002 | 0.002 | 0.002 |
| Water | 23.8 | 23.8 | 23.8 | 23.8 |

*M & T bioMeT 66 ®
**Methylether of hydroquinone

With each of these solutions used in tank 1, there is used a Part B solution in tank 2 containing 1.0 part of ammonium persulfate (AP) in 49 parts of water. When these A and B components are applied at 20° C. in succession to cracks in an 8-inch sewer conduit in equal volume by the equipment shown in the drawing, the gel time is approximately 30 seconds. Under wintry conditions (10° C.), a gel time of about 30 seconds is obtained with essentially the same monomer composition in Part A but doubling the content of TEA and doubling the content of AP in the part B component.

The application of the eight grouts described in this example 1 by conventional packer grouting equipment commonly used in the grouting of sewer lines provides a 10% monomer concentration at the grouting site that produces a polymer gel rapidly that is not so strongly adhered to the inside wall of the conduit and to the surfaces of the packer structure as to prevent movement of the deflated packer to the next leak (joint or crack) within seconds or a minute after air-testing of the seal and deflation of the packer bladders. The gel formed is also of moderate tear strength so that movement of the packer is capable of breaking up and macerating the gel inside the line without pulling the gel polymer out of the cracks, joints or fissures which extend through the wall of the sewer conduit. This enables the rapid, efficient movement of the packer from one end of the sewer line to the other with short-time interruptions at each joint or crack to be grouted. Even if the monomer mixture at the grouting sites were diluted by water lying in the sewer at the site to 5% monomer concentrations, the gel formed would generally still have adequate strength and cohesion to allow motion of the packer to the next leak without tearing the grout out of the sealed crack.

EXAMPLE 2

In each of the eight TEA/monomer solutions prepared in Example 1 above, the biocide is replaced with about 0.03 part of bis (tri-n-butyltin) oxide and about 0.005 part of a nonionic surfactant, such as t-nonyl-phenoxypoly(10)ethoxyethanol, to disperse the water-insoluble oxide. The resulting component A dispersions are applied with the appropriate AP-containing component B solutions in the manner described in Example 1. Comparable resistance to fungal attack is obtained.

EXAMPLE 3

In each of the eight TEA/monomer solutions prepared in Example 1 above, the biocide is substituted with 0.04 part of a solution in mineral spirits containing 5% by weight of bis (tributyltin) oxide and 25% by weight of cetyldimethyl benzyl ammonium chloride, the latter compound serving to emulsify the organotin oxide and also to supplement the biocidal action thereof. The resulting component A dispersions are applied with the appropriate AP-containing component B solutions in the manner described in Example 1. The resulting TEA/monomer dispersions have comparable resistance to fungal and bacterial attack before application for grouting and the polymer gels produced in grouting sewer conduits also have comparable resistance to such attack.

EXAMPLE 4

The procedure of Example 2 is repeated except that the biocide therein used is replaced with 0.02 part of 2-n-octyl-3-isothiazolone.

EXAMPLE 5

The procedure of Example 2 is repeated except that the biocide therein used is replaced with 0.02 part of 4,5-dichloro-2-benzyl-3-isothiazolone.

EXAMPLE 6

Example 2 is repeated except that 0.02 part of dichlorobenzonitrile is also added to each of the eight TEA/monomer/biocide compositions. The resulting compositions inhibit the growth of roots into the grouted sewer lines.

EXAMPLE 7

The procedure of Example 2 is repeated except that there is added to each of the TEA/monomer solutions or the AP solutions used about 5 parts of an unfired natural diatomaceous earth, of which 80% of the particles have sizes between 2 and 10 microns.

EXAMPLE 8

The procedure of Example 2 is repeated except there is added 20 parts of ethylene glycol instead of 20 parts of the water added to each of the part A and part B solutions to control shrinkage of the gel formed in a dry climate or in extremely dry weather conditions.

The use of calcium or magnesium methacrylate or the use of hydroxyethyl or hydroxypropyl methacrylates in the monomer composition provides a grout having a long gel time making it impractical for use in sewer joint grouting by means of mixing packer equipment unless extremely large amounts of TEA and/or the unusual or exotic redox systems mentioned in U.S. Pat. No. 3,580,879 are resorted to.

While the description hereinabove emphasizes adaptability of the grout components A and B of the present invention to application by the existing packer type of equipment which is moved within the sewer line after each grouting action to the next point in the line needing grouting, it has been discovered that the grout having the monomer composition defined hereinabove is also characterized by unexpected properties rendering it adaptable for applications to control flow of water in soil or earth formations during the construction of dams, tunnels, and the like. In this application, it is necessary to delay gel formation, such as by the addition of ferric ions, especially potassium ferricyanide (KF) in small amounts of 20 to 300 ppm. to the monomer solution containing the Triethanolamine (TEA) in an amount of about 0.3% on the total grout mixture. The amount of AP added may also be about 0.3% on the total grout mixture.

It has been found that the gel time is lengthened to as much as 20 minutes to several hours depending on the amount of KF that is added. The surprising and unexpected nature of this modification is that the grout mixture retains its relatively low viscosity of 2 to 10 centipoises up to the time of forming the gel so that it can readily penetrate the earth formations before gelling whereas grouts containing a methacrylate as a component (1) or (2) or both exhibits so much increase in viscosity before gelling that the earth formation may not be adequately penetrated before gel formation. The retarded gelling allows extensive penetration by the low viscosity grout and when gelation does occur it develops rapidly to form a reasonably strong gel. Thus for general grouting or sealing purposes, the appropriate amount (0.3 part or more) of AP may simply be added with suitable dilution to any one of the four TEA/monomer solutions of TABLE I produced in Example 1. The addition of the AP is withheld until just before application of the resulting mixture for sealing purposes. When the grouts hereinabove described are used for such purposes as waterproofing dams, water-control in tunnels or similar applications where longer gel times on the order of 5 to 30 minutes or when high temperatures of application are encountered as in oil well water control, small amounts of potassium ferricyanide or ferrocyanide may be added to retard gelation. From about 20 to 300 ppm. of the ferricyanide may be added to component A and preferably the amounts of TEA and AP are reduced to 0.3% each on the total grout mixture (Parts A and B).

I claim:

1. A two-part chemical grouting composition adapted to be applied upon admixture to an earth formation to control liquid flow therethrough, one part A thereof being an aqueous 10 to 24 weight % monomer solution in which the monomers therein consist essentially of a mixture of (1) a predominant proportion of magnesium diacrylate, (2) 2-hydroxyethyl acrylate, 2-hydroxypropyl acrylate, 3-hydroxypropyl acrylate, or a mixture thereof, and (3) a covalent polyethylenically unsaturated monomer, the relative proportions of monomers being 8 to 10 parts by weight of (1) to 1.6 to 2.4 parts by weight of (2) to 0.25 to 0.40 part by weight of (3), part A containing triethanolamine, from 20 to 300 parts per million of potassium ferricyanide, a small but effective amount of a biocide, and a small but effective amount of methyl ether of hydroquinone stabilizer, the other part B being an aqueous solution of ammonium persulfate at a concentration to provide in the grout mixture applied to the grouting site of the earth formation at least about 0.3% by weight of ammonium persulfate, about 10 to 12 weight % of monomers, and a concentration of triethanolamine of at least about 0.3% by weight.

2. A two-part chemical grouting composition adapted to be applied inside a waste or sewer conduit to seal leaky joints or cracks therein by means of equipment of a type having a packer unit movable to successive leaky joints or cracks in the conduit, one part A being an aqueous 20 to 24 weight % monomer solution in which the monomers therein consist essentially of a mixture of (1) a predominant proportion of magnesium diacrylate, (2) 2-hydroxyethyl acrylate, 2-hydroxypropyl acrylate, 3-hydroxypropyl acrylate, or a mixture thereof, and (3) a covalent polyethylenically unsaturated monomer, the relative proportions of monomers being 8 to 10 parts by weight of (1) to 1.6-2.4 parts by weight of (2) to 0.25-0.40 parts by weight of (3), part A also containing about 0.3 to 4% by weight of triethanolamine, a small but effective amount of a biocide, and a small but effective amount of methyl ether of hydroquinone stabilizer, the other part B being an aqueous solution of 0.3 to 6% by weight of ammonium persulfate; the proportion of ammonium persulfate in part B, the proportion of triethanolamine in part A, and the relative proportions of parts A and B that are fed to the packer and mixed on simultaneous discharge therefrom to the leaky joint or crack in the surrounding wall of the conduit being preselected in correlation to the temperature at the grouting zone to result in the formation of a polymer gel within a gel time of about 10 to about 30 seconds.

3. A grouting composition according to claim 2 wherein the acrylate (2) is 2-hydroxypropyl acrylate and the covalent comonomer (3) is N,N'-methylene-bis-acrylamide, and at least one of the two parts A and B contains a small but effective amount of an essentially water-insoluble biocide having slight water-solubility dispersed or emulsified therein by a surfactant, whereby the polymer gel formed on mixing A and B contains the biocide distributed throughout the gel mass where it is available for slow release.

4. A grouting composition according to claim 2 wherein the total monomer concentration in part A is about 20% by weight and consists essentially of a mixture of magnesium diacrylate, propyleneglycol monoacrylate, and N,N'-methylene-bis-acrylamide, the relative amounts of the several monomers being 16 parts by weight of MgA, 4 parts by weight of propyleneglycol monoacrylate, and 0.6 part by weight of MBA, and at least one of the two parts A and B contains a small but effective amount of an essentially water-insoluble biocide having slight water-solubility dispersed or emulsified therein by a surfactant, whereby the polymer gel formed on mixing A and B contains the biocide distributed throughout the gel mass where it is available for slow release.

5. A grouting composition according to claim 4 wherein at least one of the two parts A and B contains a small but effective amount of 2,6-dichlorobenzonitrile to inhibit entry and growth of roots in, on, or around the polymer gel produced.

6. In a method of grouting joints or cracks of sewer conduits with the type of conventional equipment having a mixing packer unit having an inflatable annular bladder at each end and a liquid distributor head therebetween, the packer unit being movable within the conduit in succession from one point or zone of grouting to one or more others spaced along the conduit wherein the packer is stopped within the conduit where a joint or crack to be sealed is present, an annular zone around the packer within the conduit at the crack to be sealed by grouting is isolated by inflating the annular bladders into engagement with the inside wall of the conduit, the two components A and B of a two-part grouting composition are separately and simultaneously fed to a distributor head between the bladders on the packer unit and rapidly form a grouting gel polymer in about 30 seconds upon mixing in the isolated grouting zone and shortly after testing the grouting of one zone, the bladders are deflated and the packer is moved to the next point needing grouting, and the moving and grouting is repeated to grout in succession the leaky points therein, the improvement wherein the components A and B of the two part grouting composition of claim 2 are fed separately and simultaneously to the packer unit at each grouting zone in succession.

7. In a method of grouting joints or cracks of sewer conduits with the type of conventional equipment having a mixing packer unit having an inflatable annular bladder at each end and a liquid distributor head therebetween, the packer unit being movable within the conduit in succession from one point or zone of grouting to one or more others spaced along the conduit wherein the packer is stopped within the conduit where a joint or crack to be sealed is present, an annular zone around the packer within the conduit at the crack to be sealed by grouting is isolated by inflating the annular bladders into engagement with the inside wall of the conduit, the two components A and B of a two-part grouting composition are separately and simultaneously fed to a distributor head between the bladders on the packer unit and rapidly form a grouting gel polymer in about 30 seconds upon mixing in the isolated grouting zone and shortly after testing the grouting of one zone, the bladders are deflated and the packer is moved to the next point needing grouting, and the moving and grouting is repeated to grout in succession the leaky points therein, the improvement wherein the components A and B of the two part grouting composition of claim 3 are fed separately and simultaneously to the packer unit at each grouting zone in succession.

8. In a method of grouting joints or cracks of sewer conduits with the type of conventional equipment having a mixing packer unit having an inflatable annular bladder at each end and a liquid distributor head therebetween, the packer unit being movable within the conduit in succession from one point or zone of grouting to one or more others spaced along the conduit wherein the packer is stopped within the conduit where a joint or crack to be sealed is present, an annular zone around the packer within the conduit at the crack to be sealed by grouting is isolated by inflating the annular bladders into engagement with the inside wall of the conduit, the two components A and B of a two-part grouting composition are separately and simultaneously fed to a distributor head between the bladders on the packer unit and rapidly form a grouting gel polymer in about 30 seconds upon mixing in the isolated grouting zone and shortly after testing the grouting of one zone, the bladders are deflated and the packer is moved to the next point needing grouting, and the moving and grouting is repeated to grout in succession the leaky points therein, the improvement wherein the components A and B of the two part grouting composition of claim 4 are fed separately and simultaneously to the packer unit at each grouting zone in succession.

9. In a method of grouting joints or cracks of sewer conduits with the type of conventional equipment having a mixing packer unit having an inflatable annular bladder at each end and a liquid distributor head therebetween, the packer unit being movable within the conduit in succession from one point or zone of grouting to one or more others spaced along the conduit wherein the packer is stopped within the conduit where a joint or crack to be sealed is present, an annular zone around the packer within the conduit at the crack to be sealed by grouting is isolated by inflating the annular bladders into engagement with the inside wall of the conduit, the two components A and B of a two-part grouting composition are separately and simultaneously fed to a distributor head between the bladders on the packer unit and rapidly form a grouting gel polymer in about 30 seconds upon mixing in the isolated grouting zone and shortly after testing the grouting of one zone, the bladders are deflated and the packer is moved to the next point needing grouting, and the moving and grouting is repeated to grout in succession the leaky points therein, the improvement wherein the components A and B of the two part grouting composition of claim 5 are fed separately and simultaneously to the packer unit at each grouting zone in succession.

10. A grouting composition according to claim 1 wherein the concentration of triethanolamine in part A is such as to provide a concentration thereof of at least about 0.3% by weight in the grout mixture containing about 10 to 12 weight % of monomers.

11. A grouting composition according to claim 10 wherein the amounts of ammonium persulfate and triethanolamine are about 0.3% by weight in the grouting mixture.

12. A grouting composition according to claim 2 in which the monomer (2) is propylene glycol monoacrylate, and monomer (3) is N,N′ methylene-bisacrylamide.

13. A grouting composition according to claim 11 in which the monomer (2) is propylene glycol monoacrylate, and monomer (3) is N,N′ methylene-bisacrylamide.

14. A composition according to claim 1 or claim 2 in which the biocide is bis(tri-n-butyltin)oxide and a (long-chain alkyl)dimethylbenzylammonium chloride.

* * * * *